UNITED STATES PATENT OFFICE.

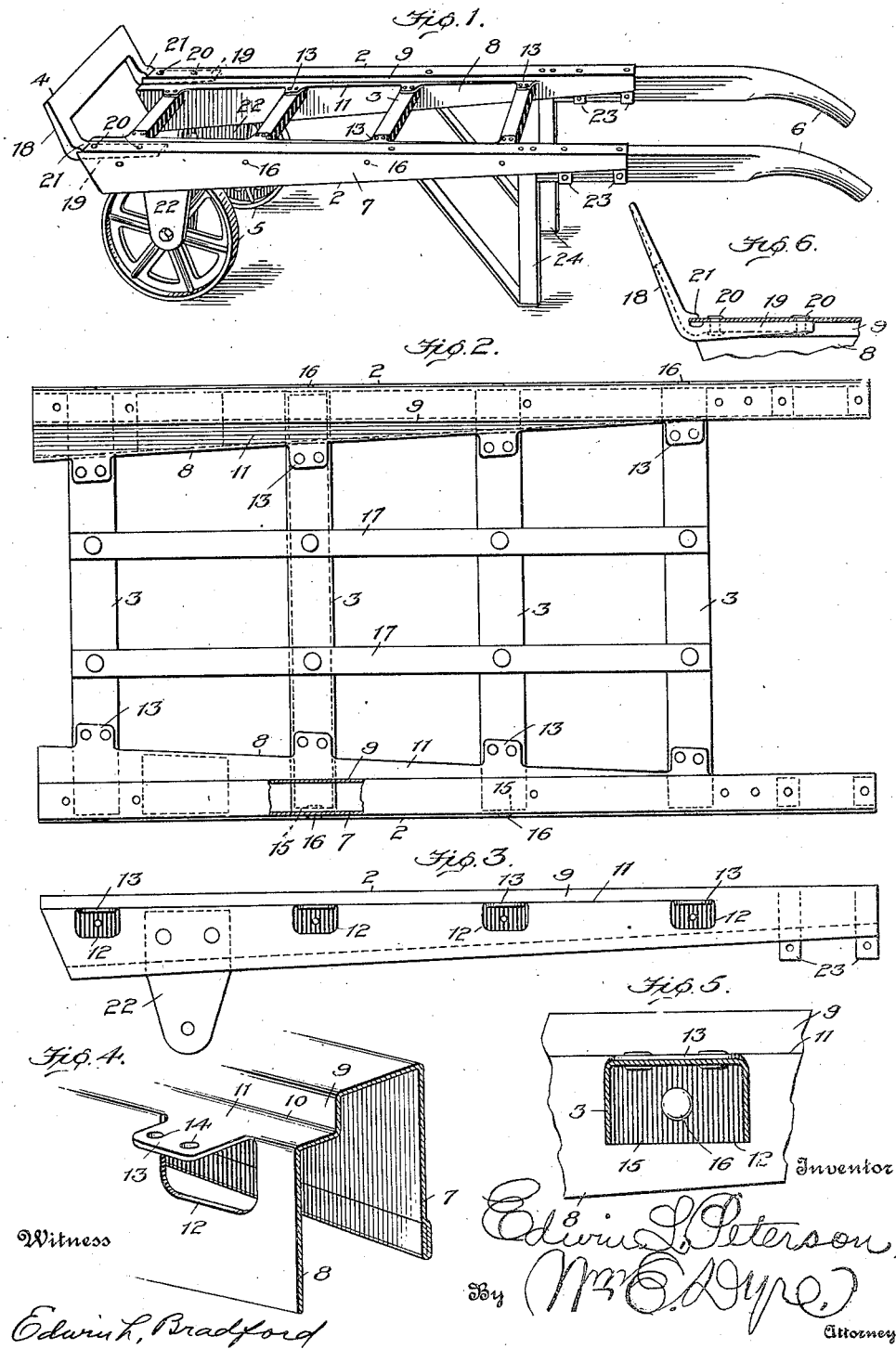

EDWIN L. PETERSON, OF PITTSBURGH, PENNSYLVANIA.

HAND TRUCK.

1,424,938.          Specification of Letters Patent.      Patented Aug. 8, 1922.

Application filed December 6, 1919. Serial No. 342,989.

*To all whom it may concern:*

Be it known that I, EDWIN L. PETERSON, a citizen of the United States, residing at Pittsburgh, in the county of Allegheny and State of Pennsylvania, have invented certain new and useful Improvements in Hand Trucks; and I do hereby declare the following to be a full, clear, and exact description of the invention, such as will enable others skilled in the art to which it appertains to make and use the same.

My invention relates to wheeled trucks, and contemplates more particularly an improved frame construction consisting of novel metal side and cross bars whereby lightness in weight and maximum load strength are made possible.

The invention has for an object the production of a wheeled truck the side members of which are formed of tapered channel bars specially provided with a retaining side rib and a progressively increasing load supporting surface; and the cross members of which are formed of channel bars arranged to extend into the channelways of the side members and be secured therein.

Another object of the present invention is to produce a novel side bar for a wheeled truck, said bar being formed from a blank of sheet metal with a longitudinal taper sufficient to receive a relatively broad supporting wheel at one end, a retaining side flange or rib, a progressively tapered load supporting surface and a plurality of integral lugs extending from the load supporting surface in the same plane thereof and adapted to be secured to the cross bars of the truck.

Another object of the invention is the production of a wheeled truck having a novel lifting nose adapted to be secured within the channelways of the side bars, thereby presenting an uninterrupted supporting surface for receiving the load, and at the same time to produce a rigid connection at this point of the truck, capable of withstanding the usual severe strains of lifting.

With these and other objects in view the invention further consists in the construction and arrangement of the several parts hereinafter described and pointed out in the appended claims.

In the accompanying drawings illustrating the preferred embodiment of my invention as now best known to me, Figure 1 is a perspective view of my improved truck;

Figure 2 is an enlarged plan view of the frame consisting of novel side and cross bars;

Figure 3 is a side view of one of the side bars as viewed from the inside of the frame;

Figure 4 is an enlarged sectional perspective through one tapered side bar, showing the retaining rib or flange and the integral attaching lug;

Figure 5 is a detail transverse sectional view through one of the cross bars illustrating the manner in which it is secured to the side bar; and Figure 6 is a detailed sectional elevation of the novel lifting nose as secured to the side bars.

The present invention has been primarily designed for general warehouse use wherein features of durability, lightness and maximum strength are essential requisites.

Referring to the drawings wherein similar reference characters designate corresponding parts, the truck combines among other things a pressed steel frame 1 formed of longitudinal side bars 2 and cross bars 3, a lifting nose 4, the usual wheels 5 and handles 6.

The longitudinal side bars 2 are formed by pressing metal blanks into the required shape. As shown herein the side bars are of channel formation having depending side flanges 7 and 8. The flanges 7 of both side bars are arranged in substantially parallel longitudinal relation when the frame of the truck is assembled and are bent back to form strengthening edges as shown. The side flanges 8 of the side bars are inwardly inclined toward each other when the truck is assembled, as clearly shown in Figure 2. This relation of the foregoing depending flanges of the side bars is due to their tapered construction whereby at the wheel end of the truck the channelway within each side bar is relatively wide to receive the supporting wheel, and at the other end of the truck it is restricted for purposes of receiving the handle 6. The uninterrupted nature of the depending flanges serves to increase the strength of the side bars as will be understood.

Each side bar 2 is provided with a retaining rib or flange 9 pressed into the bar as clearly shown in Figure 4. This rib serves to strengthen the side bar and at the same time to provide a retaining means for articles carried by the truck as will be understood.

Immediately adjacent the rib or flange 9 the side bar is bent inwardly as at 10 to form a supporting surface 11. This surface 11 progressively increases in area toward the wheeled end of the truck due to the taper or incline of the inner depending flange 8 of the side bar.

The cross bars 3 of the truck frame are secured to the longitudinal side bars 2. These cross bars are of channel formation as shown and are arranged to extend through openings 12 formed in the flange 8 of each side bar. Each opening 12 in the flange 8 of the side bar is formed by stamping therefrom an integral lip or lug 13 capable of being bent into a plane corresponding to that of the load supporting surface 11, see Figure 4.

Suitable openings 14 are provided in the lugs 13 for receiving bolts or rivets whereby the cross bars 3 can be securely attached to the side bars 2.

The ends of the cross bars 3 are closed as at 15 and are also bolted or riveted to the flanges 7 of the side bars 2 as shown at 16. These points of connection between the side and cross bars have been found to strengthen the frame 1, and prevent longitudinal or lateral displacement. It will be noted that in making these connections I avail myself of the best known methods of assembling, and I do not limit myself to either a rivet or bolt connection, but may readily use the spot welding process of obtaining permanent connections.

The truck frame 1 may be supplemented as shown with strips or additional supporting bars 17 suitably secured to the cross channels 3. While I have shown these strips 17 as longitudinally disposed, it will be obvious that many other forms of supplementary framing can be used.

The lifting nose 18 is of novel construction and comprises the usual pilot blade from which extend opposite arms 19 arranged to extend within the channelways of the side bars 2 and be secured to the under side thereof as at 20. The arms 19 are preferably of a width capable of snugly fitting within the rib or flange 9 of the side bars, thereby insuring rigidity against lateral movement. At the base of the pilot blade and adjacent the arms 19, lugs 21 are provided for purposes of engaging the upper surfaces of the ends of the side bars 2, as shown in Figure 6. These lugs serve to further secure the lifting nose to the side bars so as to proportion the relative strains imparted to the said nose and side bars when a load is lifted upon the truck.

The wheels of the truck are preferably journalled in depending bearing brackets 22 secured within the channelways of the side bars as shown. The taper of the side bars permits the use of relatively broad supporting wheels.

The handles 6 of the truck are preferably of wood and are secured within the channelways of the side bars 2 by means of straps 23 as shown in Figure 1. These straps 23 may be integrally formed from the metal blanks of the side bar or they may be independently secured thereto.

Supporting legs 24 are shown attached to the side bars 2. The legs are riveted or otherwise secured within the channelways of the side bars.

From the foregoing it will be apparent that a durable and comparatively inexpensive truck has been produced wherein advantages of strength and lightness are derived through the use of novel side and cross bars. It will also be obvious that the use of a channel side bar capable of housing the several other elements of the truck, including the supporting wheels, handles and supporting legs increases the stability of the truck in both lateral and longitudinal directions.

Various changes in the size and proportion of the several parts may be made and I do not limit myself to the exact construction set forth herein.

I claim:

1. A wheeled truck having a body portion comprising a metal frame formed of longitudinal channel side bars having progressively increasing load supporting surfaces formed thereon, lugs provided on said side bars and a plurality of cross bars extending into said channel bars and secured to said lugs and side bars.

2. A wheeled truck having a body portion comprising a metal frame formed of longitudinal channel bars having progressively increasing load supporting surfaces thereon, lugs formed integral with said side bars and extending therefrom in the same plane as the load supporting surfaces, and a plurality of cross bars extending into said channel bars and secured to said lugs.

3. A wheeled truck having a body portion comprising a metal frame formed of longitudinally tapered channel side bars having offset load supporting surfaces, a plurality of cross bars extending into the channelways of the side bars and secured therein, and relatively wide wheels journalled in said side bars and arranged to extend into the channelways at the wider portion thereof.

4. A pressed metal side bar for trucks formed with depending side flanges one of which is bent to form a longitudinal rib, and the other of which is provided with a plurality of lugs formed from a series of openings provided in one of the depending side flanges.

5. A pressed metal channelled side bar for wheeled trucks formed with depending side flauges, one of which is bent to form a load supporting surface and a tapered channelway for the reception of a relatively wide wheel.

In testimony whereof I affix my signature, in presence of two subscribing witnesses.

EDWIN L. PETERSON.

Witnesses:
MAURICE GRIER,
A. C. CHIA.